(12) United States Patent
You et al.

(10) Patent No.: US 8,570,270 B2
(45) Date of Patent: Oct. 29, 2013

(54) BACKLIGHT UNIT COLOR COMPENSATION TECHNIQUES

(75) Inventors: Chenhua You, San Jose, CA (US); Shengmin Wang, Hsinchu (TW)

(73) Assignee: Apple Inc., Cupertino, CA (US)

( * ) Notice: Subject to any disclaimer, the term of this patent is extended or adjusted under 35 U.S.C. 154(b) by 666 days.

(21) Appl. No.: 12/709,957

(22) Filed: Feb. 22, 2010

(65) Prior Publication Data
US 2011/0090142 A1 Apr. 21, 2011

Related U.S. Application Data

(60) Provisional application No. 61/253,060, filed on Oct. 19, 2009.

(51) Int. Cl.
*G09G 3/36* (2006.01)
(52) U.S. Cl.
USPC ........ 345/102; 362/97.1; 362/97.2; 362/97.3; 349/66; 349/71; 345/83; 345/88
(58) Field of Classification Search
USPC ............ 345/88, 100, 102; 362/84, 97.1–97.3, 362/612–613, 600; 349/66, 71
See application file for complete search history.

(56) References Cited

U.S. PATENT DOCUMENTS

| 3,712,706 | A * | 1/1973 | Stamm | 359/531 |
|---|---|---|---|---|
| 2003/0227768 | A1 * | 12/2003 | Hara et al. | 362/31 |
| 2005/0174521 | A1 * | 8/2005 | Nishida et al. | 349/141 |
| 2005/0265029 | A1 * | 12/2005 | Epstein et al. | 362/339 |
| 2006/0001036 | A1 * | 1/2006 | Jacob et al. | 257/98 |
| 2006/0186431 | A1 * | 8/2006 | Miki et al. | 257/100 |
| 2006/0208268 | A1 * | 9/2006 | Ueno et al. | 257/98 |
| 2006/0239629 | A1 | 10/2006 | Qi et al. | |
| 2006/0262539 | A1 * | 11/2006 | Goulet et al. | 362/335 |
| 2006/0290844 | A1 * | 12/2006 | Epstein et al. | 349/113 |
| 2007/0153548 | A1 | 7/2007 | Hamada et al. | |
| 2007/0201226 | A1 | 8/2007 | Nishigaki | |
| 2007/0279931 | A1 * | 12/2007 | Bryan et al. | 362/600 |

(Continued)

FOREIGN PATENT DOCUMENTS

WO 2008/144650 A1 11/2008

OTHER PUBLICATIONS

EP 2 120 088, European Patent Application, "Backlight Unit Including Light Emitting Diodes and Liquid Crystal Display Device including the Same" Lee, Koo-Hwa et.al. Nov. 18, 2009.*

*Primary Examiner* — Lun-Yi Lao
*Assistant Examiner* — Saiful A Siddiqui
(74) *Attorney, Agent, or Firm* — Fletcher Yoder PC

(57) ABSTRACT

An edge-lit backlight unit for displays is provided. In one embodiment, the backlight may include a light guide configured to receive light from a light source along a first lateral edge. The received light propagates towards a second opposite lateral edge. The backlight unit may include an arrangement of light-extracting elements configured to extract a portion of the propagating light and to allow the remaining portion to reach the second edge. In one embodiment, a specular reflector disposed at the second edge causes the light reaching the second edge to retro-propagate back towards the first edge. In certain embodiments, the retro-propagating light may be between approximately 5 to 35 percent of the total light received by the light guide. The retro-propagating light may be extracted by multiple light-extracting elements and mixed with the extracted propagating light to provide improved color uniformity along an axis of the display.

35 Claims, 9 Drawing Sheets

(56) References Cited

U.S. PATENT DOCUMENTS

| | | | |
|---|---|---|---|
| 2008/0129927 A1* | 6/2008 | Hamada et al. | 349/65 |
| 2008/0212315 A1* | 9/2008 | Cornelissen et al. | 362/219 |
| 2008/0225512 A1* | 9/2008 | Roberts et al. | 362/97 |
| 2008/0285307 A1 | 11/2008 | Aylward et al. | |
| 2009/0034230 A1* | 2/2009 | Lim et al. | 362/84 |
| 2009/0097271 A1* | 4/2009 | Chen et al. | 362/612 |
| 2009/0141512 A1* | 6/2009 | Eberwein | 362/497 |
| 2009/0316077 A1* | 12/2009 | Li et al. | 349/65 |
| 2010/0014027 A1* | 1/2010 | Li et al. | 349/65 |
| 2010/0026632 A1* | 2/2010 | Ishida et al. | 345/170 |
| 2010/0079702 A1* | 4/2010 | Ito et al. | 349/64 |
| 2010/0219428 A1* | 9/2010 | Jung et al. | 257/89 |
| 2010/0265584 A1* | 10/2010 | Coggio et al. | 359/530 |
| 2011/0032729 A1* | 2/2011 | Duong et al. | 362/607 |
| 2011/0242844 A1* | 10/2011 | Kim et al. | 362/607 |
| 2011/0305002 A1* | 12/2011 | Lim et al. | 362/84 |

* cited by examiner

US 8,570,270 B2

BACKLIGHT UNIT COLOR COMPENSATION TECHNIQUES

CROSS-REFERENCE TO RELATED APPLICATIONS

This application claims the benefit of U.S. Provisional Patent Application No. 61/253,060, entitled "Backlight Unit Color Compensation Techniques", filed Oct. 19, 2009, which is herein incorporated by reference.

BACKGROUND

The present disclosure relates generally to display devices and, more particularly, to techniques for improving color uniformity in display devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, light-emitting diodes (LEDs) have begun to replace fluorescent lighting, such as cold cathode fluorescent lamps (CCFLs), as a light source for backlight units of liquid crystal displays (LCDs) used in a wide variety of electronic devices, including such consumer electronics as televisions, computers, and handheld devices (e.g., cellular telephones, audio and video players, portable gaming systems, and so forth). This is due at least in part to a number of advantages that LEDs exhibit over CCFLs, including improved efficiency and higher light output, lower power consumption, reduced heat output, and longer operational life. Additionally, LEDs are generally more environmentally friendly relative to CCFLs (e.g., CCFLs may contain mercury, whereas LEDs do not).

While LEDs retain several advantages over CCFLs, due to the manner in which certain LEDs are fabricated, particularly phosphor-coated LEDs, chromaticity variations may be present in the light emitted from an LED over a range of angles (e.g., a "viewing angle") relative to an optical axis. In certain backlight units, such as edge-lit backlight units, these variations in chromaticity may negatively affect the color uniformity of the light emitted from a light guide of the backlight unit, such as by causing a color shift along an axis of the backlight unit. As such, it may be beneficial to provide a technique for reducing color shift caused by chromaticity variations of LED lighting, thereby improving color uniformity in LCD displays that utilize LEDs as a light source.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to an edge-lit backlight unit for a display device, such as an LCD display. In one embodiment, the edge-lit backlight unit includes a light guide configured to receive light from a light source along a first lateral edge and to propagate the received light towards a second opposite lateral edge. The backlight unit may include a light-extracting layer having multiple light-extracting elements configured to extract a portion of the propagating light and to allow the remaining portion to reach the second lateral edge. For instance, the light-extracting layer may generally be understood to be an arrangement of the light-extracting elements and may be formed on a rear surface of the light guide. The light-extracting surface area provided by the light-extracting elements on the rear surface may be less relative to the arrangement of light-extracting elements on rear surfaces of light guides in conventional backlight units. In one embodiment, a specular reflector disposed at the second lateral edge may cause retro-propagation of the light reaching the second lateral edge back towards the first lateral edge. The retro-propagating light may be extracted by the multiple light-extracting elements and mixed with the extracted propagating light to provide improved color uniformity along an axis of the display. In certain embodiments, the retro-propagating light may be between approximately 5 to 35 percent of the total light received by the light guide.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
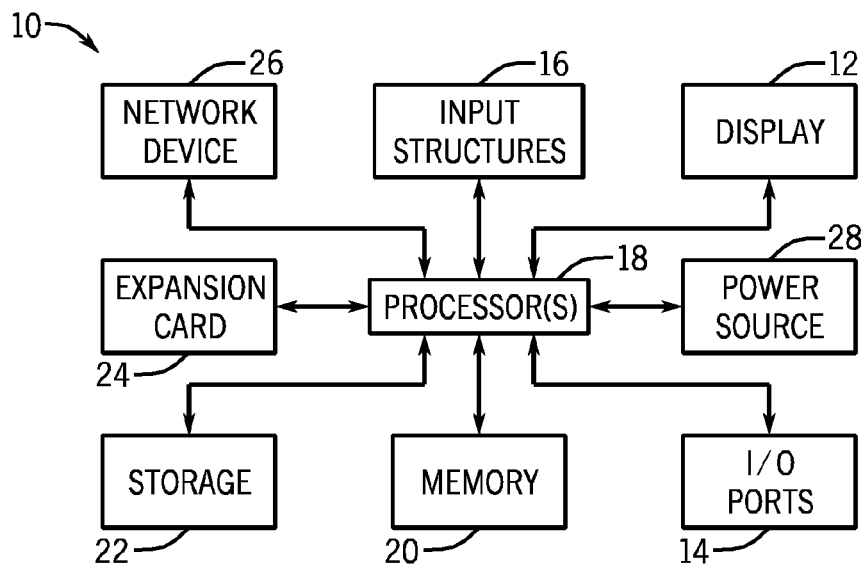
FIG. 1 is a block diagram of exemplary components of an electronic device that may incorporate certain aspects of the present disclosure.

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As will be discussed below, the present disclosure is generally directed to edge-lit backlight units for display devices. Particularly, the present application discloses edge-lit backlight units that provide for reduced color shift and, therefore, improved color uniformity compared to certain traditional backlight units. The presently disclosed backlight units may compensate for color shift caused by chromaticity variations in light emitted by certain types of light-emitting diodes (LEDs), particularly at angles farther from an optical axis. As discussed in greater detail below, in some embodiments, edge-lit backlight units in accordance with the present techniques include a light guide configured to provide for propagation of light received from a light source from a first lateral edge to a second opposite lateral edge. A portion of the received light is allowed to reach the second lateral edge and is retro-propagated back towards the first lateral edge. Multiple light-extracting elements are provided to extract and mix the propagating and retro-propagating light, such that the light emitted from the light guide exhibits improved color uniformity.

Keeping the above points in mind, a general description of electronic devices that may employ such an edge-lit backlight unit is provided below. As may be appreciated, such an electronic device may include various internal and/or external components which contribute to the function of the device. For instance, FIG. 1 is a block diagram illustrating components that may be present in one such electronic device 10, and which may allow the device 10 to function in accordance with the techniques discussed herein. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. It should further be noted that FIG. 1 is merely one example of a particular implementation and is merely intended to illustrate the types of components that may be present in the electronic device 10. For example, in the presently illustrated embodiment, these components may include a display 12, input/output (I/O) ports 14, input structures 16, one or more processors 18, memory device(s) 20, non-volatile storage 22, expansion card(s) 24, networking device 26, and power source 28.

With regard to each of these components, it is first noted that the display 12 may be used to display various images generated by the electronic device 10. In various embodiments, the display 12 may be a liquid crystal display (LCD), such as an LCD utilizing light-emitting diodes (LEDs) as a backlight source. Additionally, in certain embodiments of the electronic device 10, the display 12 may be provided in conjunction with a touch-sensitive element, such as a touchscreen, that may be used as part of a control interface for the device 10. As will be discussed below, the display 12 may include an edge-lit backlight unit implementing one or more of the techniques described herein to provide for reduced color shift and thus improved color uniformity across the display 12.

The I/O ports 14 may include various ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USB) port, a video port, a serial connection port, an IEEE-1394 port, an Ethernet or modem port, and/or an AC/DC power connection port. In one embodiment, the I/O ports 14 may include a proprietary port from Apple Inc. of Cupertino, Calif., that may function to charge the power source 28 (which may include one or more rechargeable batteries) of the device 10, or to transfer data between the device 10 and an external source.

The input structures 16 may include the various devices, circuitry, and pathways by which user input or feedback is provided to the processor(s) 18. Such input structures 16 may be configured to control various functions of the electronic device 10, applications running on the device 10, and/or any interfaces or devices connected to or used by the device 10. For example, the input structures 16 may allow a user to navigate a displayed user interface (e.g., a graphical user interface) or application interface. Non-limiting examples of the input structures 16 include buttons, sliders, switches, control pads, keys, knobs, scroll wheels, keyboards, mice, touchpads, and so forth. User interaction with input structures 16, such as to interact with a user or application interface displayed on display 12, may generate electrical signals indicative of user input, which may be routed via suitable pathways, such as an input hub or bus, to the processor(s) 18 for further processing.

Additionally, in certain embodiments, one or more of the input structures 16 may be provided together with the display 12, such an in the case of a touchscreen, in which a touch sensitive mechanism is provided in conjunction with the above-mentioned display 12. In such embodiments, the user may select or interact with displayed interface elements via the touch sensitive mechanism. In this manner, the displayed interface may provide interactive functionality, allowing a user to navigate the displayed interface by touching the display 12, such as by way of the user's finger or a stylus.

The processor(s) 18 may include one or more microprocessors, such as one or more "general-purpose" microprocessors, one or more special-purpose microprocessors and/or ASICS, or some combination of such processing components, and may provide the processing capability to execute the operating system, programs, user and application interfaces, and any other functions of the electronic device 10. For example, processor(s) 18 may include one or more reduced instruction set (RISC) or x86 processors, as well as graphics processors (GPU), video processors, audio processors, and the like. As will be appreciated, the processor(s) 18 may be communicatively coupled to one or more data buses or chipsets for transferring data and instructions between various components of the electronic device 10.

Programs or instructions executed by the processor(s) 18 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by the processor(s) 18 to enable the device 10 to provide various functionalities, including those described herein.

The instructions or data to be processed by the processor(s) 18 may be stored in a computer-readable medium, such as the memory 20. The memory 20 may include a volatile memory, such as random access memory (RAM), and/or a non-volatile memory, such as read-only memory (ROM), or a combination of RAM and ROM devices. The memory 20 may store a variety of information and may be used for various purposes. For example, the memory 20 may store firmware for the electronic device 10 (such as basic input/output system (BIOS)), an operating system, and various other programs, applications, or routines that may be executed on the electronic device 10, including user interface functions, processor functions, and so forth. In addition, the memory 20 may be used for buffering or caching during operation of the electronic device 10.

The components of the device 10 may further include other forms of computer-readable media, such as the non-volatile storage 22, for persistent storage of data and/or instructions. The non-volatile storage 22 may include, for example, flash memory, a hard drive, or any other optical, magnetic, and/or solid-state storage media. By way of example, the non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards 24 that may be used to add functionality, such as additional memory, I/O functionality, or networking capability, to the electronic device 10. Such expansion cards 24 may connect to the device 10 through any type of suitable connector, and may be accessed internally or external to the housing of the electronic device 10. For example, in one embodiment, the expansion card(s) 24 may include a flash memory card, such as a SecureDigital (SD) card, mini- or microSD, CompactFlash card, Multimedia card (MMC), or the like. Additionally, the expansion cards 24 may include one of the processor(s) 18 of the device 10, such as a video graphics card having a GPU for facilitating graphical rendering by the device 10.

The components depicted in FIG. 1 also include the network device 26, such as a network controller or a network interface card (NIC). For example, the network device 26 may be a wireless NIC providing wireless connectivity over any 802.11 standard or any other suitable wireless networking standard. The network device 26 may allow the electronic device 10 to communicate over a network, such as a personal area network (PAN), a local area network (LAN), a wide area network (WAN), such as an Enhanced Data Rates for GSM Evolution (EDGE) network or a 3G data network (e.g., based on the IMT-2000 standard), or the Internet. By way of the network device 26, the electronic device 10 may connect to and send or receive data with any device on the network, such as portable electronic devices, personal computers, printers, and so forth. In some embodiments, the network device 26 may be added as one expansion card 24 to provide for the networking capability as described above.

As also illustrated in FIG. 1, the device 10 may include the power source 28. In one embodiment, the power source 28 may be one or more batteries, such as a lithium-ion polymer battery or other type of suitable battery. The battery may be user-removable or may be secured within the housing of the electronic device 10, and may be rechargeable. Additionally, the power source 28 may include AC power, such as provided by an electrical outlet, and the electronic device 10 may be connected to the power source 28 via a power adapter. In embodiments where the power source 28 also includes one or more batteries, such a power adapter may used to recharge the one or more batteries.

Figure 2:
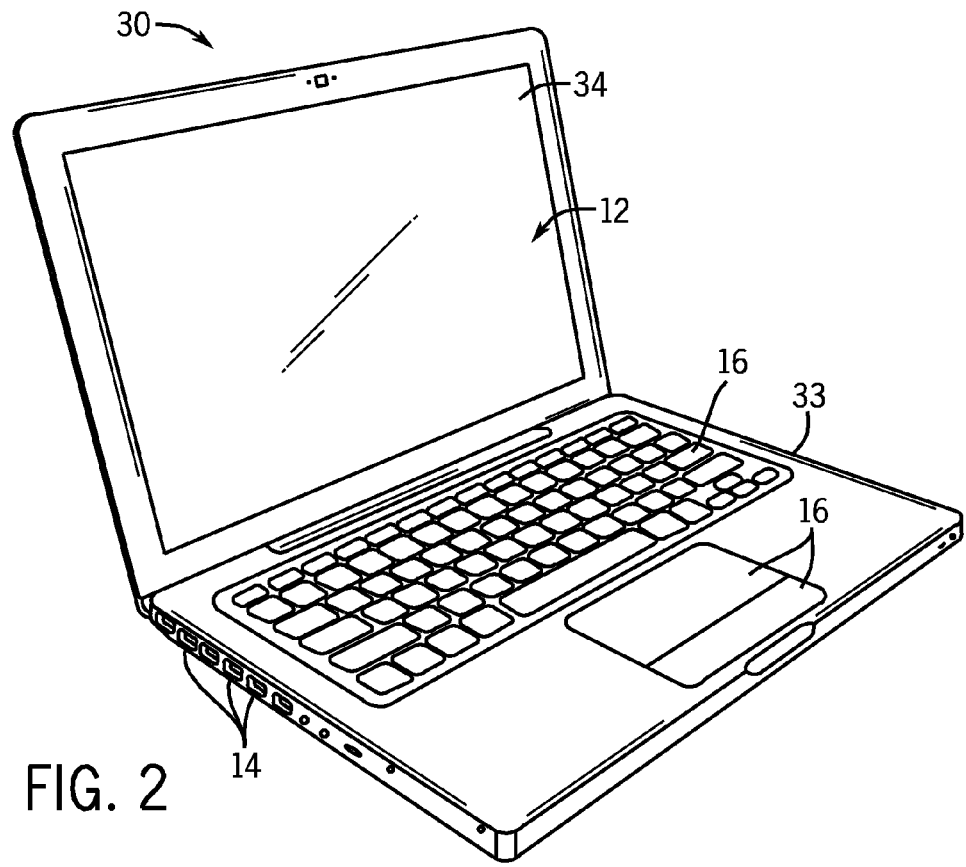
FIG. 2 is a perspective view of a computer, in accordance with aspects of the present disclosure.

Having described the exemplary components depicted in FIG. 1, it should be appreciated that the electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® Mini, or Mac Pro®, available from Apple Inc. By way of example, the electronic device 10 in the form of laptop computer 30 is illustrated in FIG. 2 in accordance with one embodiment. The depicted computer 30 includes a housing or enclosure 33, the display 12 (e.g., LCD 34 or some other suitable display), I/O ports 14, and input structures 16.

In one embodiment, the input structures 16 (such as a keyboard and/or touchpad mouse) may be used to interact with the computer 30, such as to start, control, or operate a graphical user interface (GUI) or applications running on the computer 30. For example, a keyboard and/or touchpad may allow a user to navigate a user interface or application interface displayed on the display 12 (e.g., LCD 34).

As depicted, the electronic device 10 in the form of the computer 30 may also include various I/O ports 14 to allow connection of additional devices. For example, the I/O ports 14 may include a USB port, a DVI port, a DisplayPort port, or some other port suitable for connecting to another electronic device, a projector, a supplemental display, and so forth. In addition, computer 30 may include network connectivity, memory, and storage capabilities, as described with respect to FIG. 1. As a result, computer 30 may store and execute a GUI and other applications.

As mentioned above, the computer 30, in other embodiments, may also be a desktop computer or workstation/server computer that is generally designed to be less portable than the illustrated laptop computer 30 of FIG. 2. In such embodiments, the display 12 may be a standalone display that interfaces with the computer 30 using one of the I/O ports 14, such as via a DisplayPort, DVI, or analog (D-sub) interface. For instance, in certain embodiments, such a standalone display 12 may be a model of an Apple Cinema Display®, available from Apple Inc. As will be discussed below, the display 12 may include an edge-lit backlight unit implementing one or more of the techniques described herein to provide for reduced color shift and, therefore, improved color uniformity across the display 12.

Figure 3:
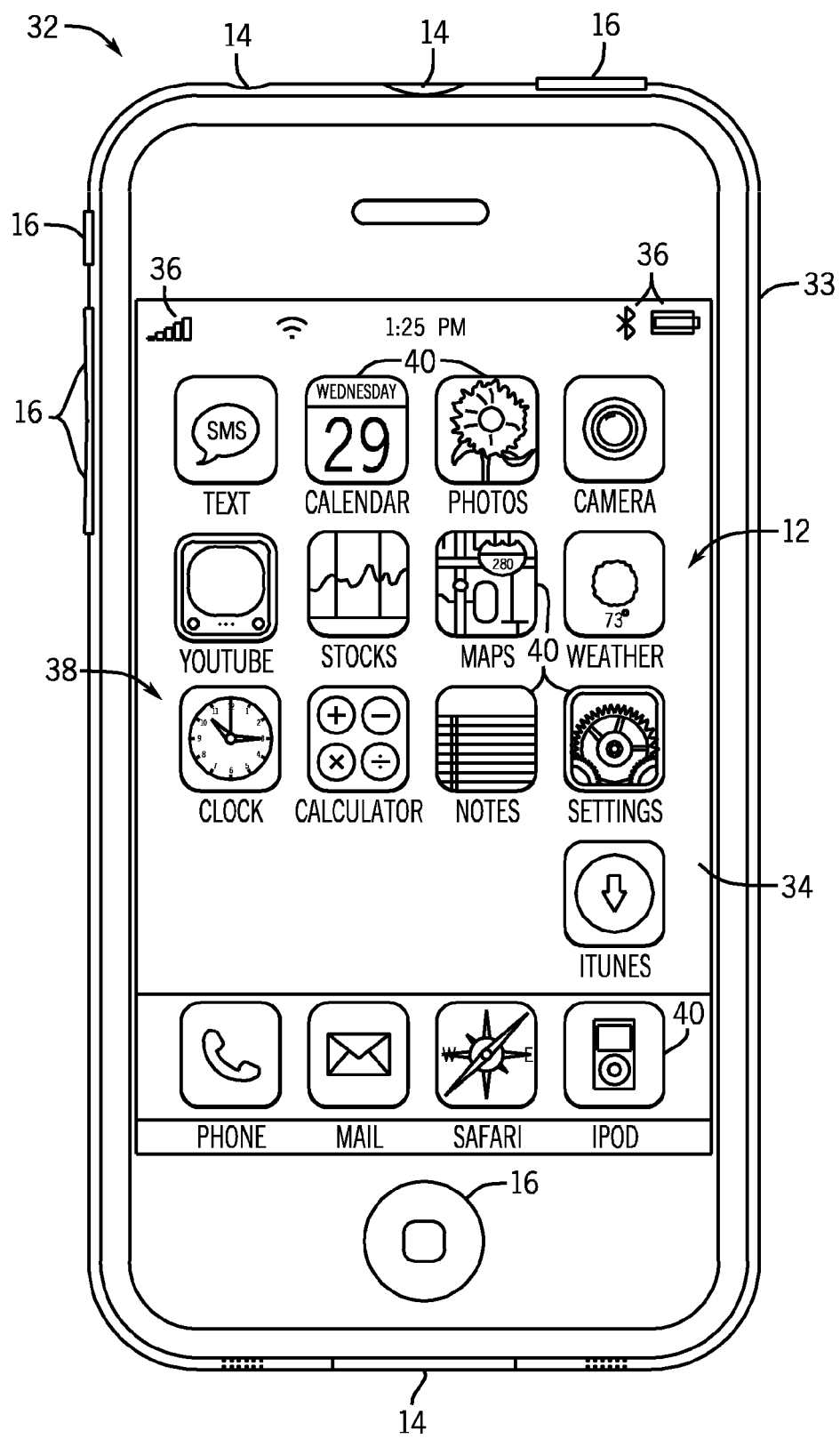
FIG. 3 is a front-view of a handheld electronic device, in accordance with aspects of the present disclosure.

While the electronic device 10 is generally depicted in the context of a computer in FIG. 2, it should be appreciated that the electronic device 10 may also take the form of other types of devices. In some embodiments, various electronic devices 10 may include mobile telephones, media players for playing music and/or video, personal data organizers, handheld game platforms, cameras, and/or combinations of such devices. For instance, as generally depicted in FIG. 3, the device 10 may be provided in the form of a handheld electronic device 32 that includes various functionalities (such as the ability to take pictures, make telephone calls, access the Internet, communicate via email, record audio and/or video, listen to music, play games, connect to wireless networks, and so forth). By way of further example, the handheld device 32 may be a model of an iPod® or iPhone® available from Apple Inc. In other embodiments, however, other types of handheld devices (such as other media players for playing music and/or video, personal data organizers, handheld game platforms, and/or combinations of such devices) may also be suitably provided as the electronic device 10.

The handheld device 32 of the presently illustrated embodiment includes an enclosure or body 33 that protects the interior components from physical damage and shields them from electromagnetic interference. The enclosure 33 may be formed from any suitable material such as plastic, metal or a composite material and may allow certain frequencies of electromagnetic radiation to pass through to wireless communication circuitry within the handheld device 32 to facilitate wireless communication.

The handheld electronic device 32 may also include various input and output (I/O) ports 14 that allow connection of the handheld device 32 to external devices. For example, one I/O port 14 may be a port that allows the transmission and reception of data or commands between the handheld electronic device 32 and another electronic device, such as a computer. Such an I/O port 14 may be a proprietary port from Apple Inc. or may be an open standard I/O port (e.g., USB, FireWire, etc.).

In the depicted embodiment, the enclosure 33 includes the user input structures 16 through which a user may interface with the device 32. Each user input structure 16 may be configured to help control one or more device functions when actuated. For example, in a mobile telephone implementation, one or more input structures 16 may be configured to invoke a "home" screen or menu to be displayed, to toggle between a sleep and a wake mode, to silence a ringer for a cell phone application, to increase or decrease a volume output, and so forth.

In the depicted embodiment, the handheld device 32 includes the display 12, which may be in the form of an LCD 34. The LCD 34 may display various images generated by the handheld device 32. For example, the LCD 34 may display various system indicators 36 that provide feedback to a user with regard to one or more states of the handheld device 32, such as power status, signal strength, call status, external device connections, and so forth.

The LCD 34 may also be configured to display a graphical user interface (GUI) 38 that allows a user to interact with the handheld device 32. As can be appreciated, the GUI 38 may include various layers, windows, screens, templates, or other graphical elements that may be displayed in all, or a portion, of the LCD 34. Generally, the GUI 38 may include graphical elements that represent applications and functions of the electronic device, such as icons 40, as well as other images representing buttons, sliders, menu bars, and the like. The icons 40 may correspond to various applications of the electronic device that may open upon selection of a respective icon 40. Furthermore, selection of a particular icon 40 may lead to a hierarchical navigation process, such that selection of the particular icon 40 leads to a screen that includes one or more additional icons or other GUI elements. In certain embodiments, the icons 40 may be selected via a touchscreen provided with the display 12, or may be selected by one or more of the user input structures 16, such as a wheel or button. Of course, the LCD display 34 may also be used to display other data, images, or visual outputs, such as digital photographs or video data.

Figure 4:
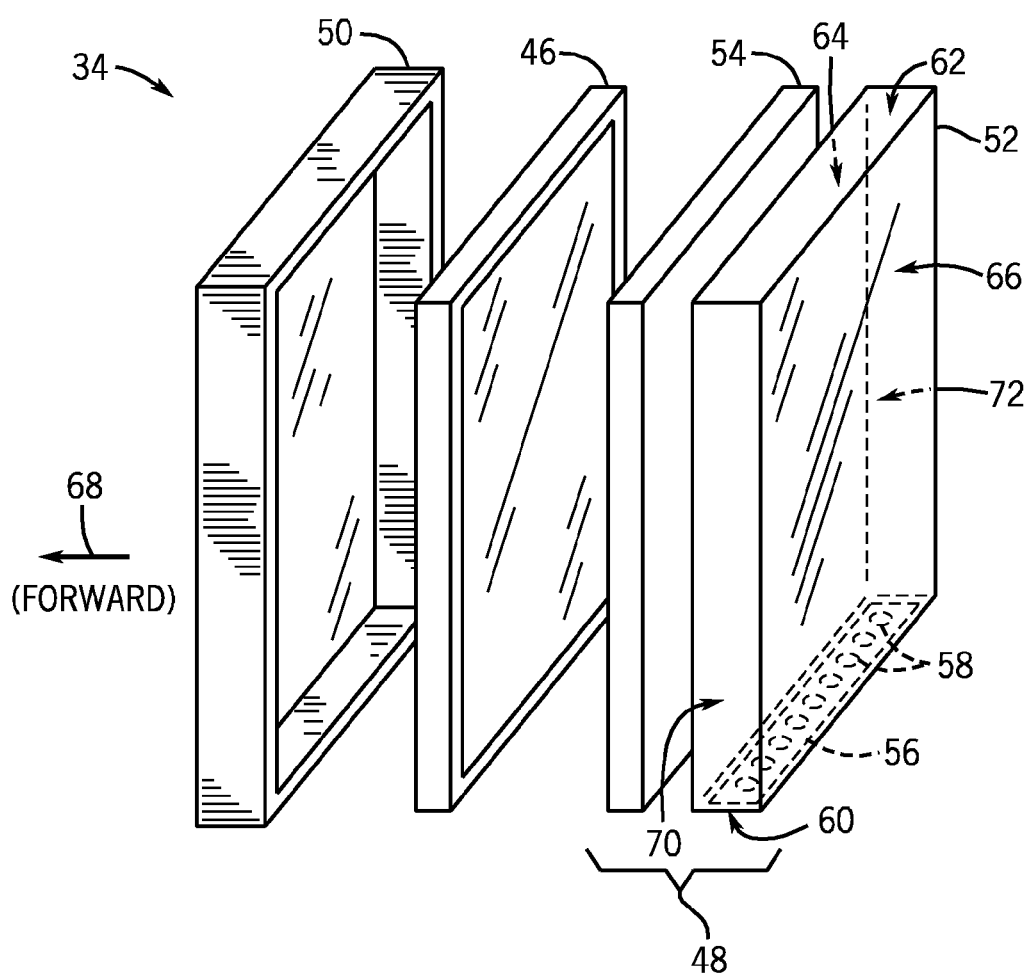
FIG. 4 is a simplified exploded perspective view of a liquid crystal display (LCD) including an edge-lit backlight unit, in accordance with aspects of the present disclosure.

Continuing now to FIG. 4, one example of an LCD display 34 is depicted in accordance with one embodiment. As shown, the LCD display 34 may generally include an LCD panel 46 and a backlight unit 48, which may be assembled within a frame or enclosure 50. The LCD panel 46 may include numerous pixels configured to selectively modulate the amount and color of light passing from the backlight unit 48 through the LCD panel 46. For example, the LCD panel 46 may include a liquid crystal layer, one or more thin film transistor layers configured to control orientation of liquid crystals of the liquid crystal layer via an electric field, and polarizing films, which cooperate to enable the LCD panel 46 to control the amount of light emitted by each pixel. The LCD panel 46 may be a twisted nematic (TN) panel, an in-plane switching (IPS) panel, a fringe-field switching (FFS) panel, variants of the foregoing types of panels, or any other suitable panel.

In the illustrated embodiment, the backlight unit 48 is depicted as being an edge-lit backlight unit, and includes a light guide 52, such as a light guiding plate, one or more optical films 54, such as one or more brightness enhancement films, and a light source 56 having a number of lighting elements 58, such as LEDs. As shown, the light source 56 is positioned to provide light to a lateral edge 60 of the light guide 52. In certain embodiments, the light guide 52 may be formed using polymethyl-methacrylate ("PMMA"), an acrylic glass, and the backlight unit 48 may thus be referred to as a "PMMA" backlight. It is noted, however, that the light guide 52 may be formed of other suitable materials. Further, in some embodiments, the light guide 52 may be an air guide (e.g., rather than using a material like PMMA, the propagation medium within the light guide may be air).

Light from the light source 56 generally propagates through the light guide 52 towards an opposite lateral edge 62 via total internal reflection at forward 64 and rear 66 surfaces of the light guide 52, and may ultimately be emitted therefrom towards the optical film(s) 54 and LCD panel 46. For example, the light guide 52 may include certain optical features on either or both of the forward 64 and rear 66 surfaces that disrupt total internal reflection. The optical features, which may be referred to as "light-extracting elements," may be specular, diffuse, or a combination of both specular and diffuse elements. The light-extracting elements generally function to reflect and/or refract the propagating light. For instance, in one embodiment, the light guide 52 may include a light-extracting layer (not shown in FIG. 4) formed along the rear surface 66 that includes the light-extracting elements, such as printed dots, micro-lenses, and/or micro-prisms, or any other type of optical feature suitable for disrupting total internal reflection. The light-extracting elements may have specular or diffuse properties, or a combination of such properties, and may reflect and/or refract light towards a back reflector (not shown in FIG. 4). The back reflector, which may be a diffuse reflector, may be disposed adjacent the light-extracting elements on the rear surface 66 to direct at least some of the light impacting the light-extracting elements towards the front surface 64 of the light guide 52, where it may emitted therefrom in the forward direction 68.

Before continuing, it should be understood that the use of the positional terms, such as forward, rear, top, and bottom, etc., are intended to refer to the orientation of the light guide 52 shown in FIG. 4. For instance, as mentioned above, the surfaces 64 and 66 may be referred to as the forward and rear surfaces, respectively. Additionally, the lateral edges 60 and 62 may be referred to as the top/upper and bottom/lower edges, respectively, and the edges 70 and 72 may be referred to as side edges. While these terms are used within the present disclosure for clarity, it should be understood that these positions may change depending on the actual orientation of the LCD display 34.

As discussed above, due to the nature in which certain LEDs are fabricated, chromaticity variations may exist in the light emitted therefrom. Accordingly, FIGS. 5-9 are provided herein to more clearly illustrate how such chromaticity variations may result in an undesirable color shift being present along an axis of a backlight unit.

Figure 5:
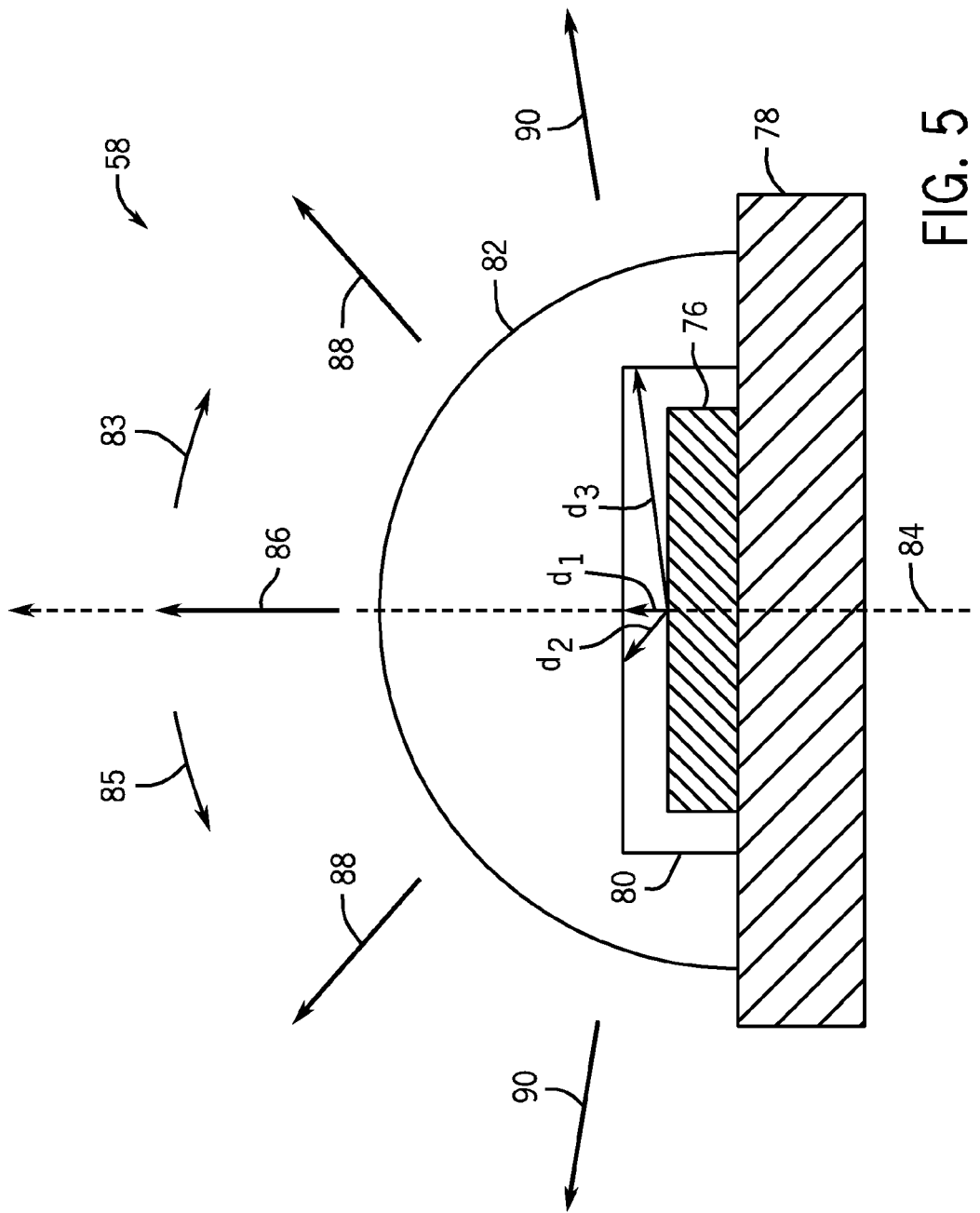
FIG. 5 is a cross-sectional view showing the operation of a light-emitting diode (LED)

Referring to FIG. 5, a simplified cross-sectional view of one of the LEDs 58 of the light source 56 shown in FIG. 4 is depicted. In accordance with aspects of the present disclosure, the LED 58 may be a phosphor-coated LED that is configured to emit generally white light. For instance, the LED 58 may include a substrate 78 upon which a semiconductor material 76 (a "die") is formed and coated with a phosphor layer 80. By way of example, an LED configured to emit generally white light may include a blue-light emitting die, such as indium gallium nitride (InGaN) or gallium nitride (GaN), coated with a yellow phosphor layer, such as cerium-doped yttrium aluminum garnet ($Ce^{3+}$:YAG). While certain embodiments described in the present disclosure will refer to the LED 58 as including a blue-light emitting die and yellow phosphor coating, it should be understood that the LED 58 may include other types of phosphor-coated LEDs that emit generally white light, such as LEDs having a blue-die with a red and green phosphor coating, and may also include other phosphor-coated LEDs configured to emit light having a color other than white.

In operation, the LED 58 becomes forward biased when switched on, thereby allowing electrons to recombine with holes to release energy in the form of light. The light is emitted from the LED 58 (e.g., through the lens 82), and may be received by the light guide 52. Due to the different distances in which blue light emitted from the die 76 travels through the phosphor layer 80 of the LED 58, the light ultimately emitted from the LED 58 may exhibit chromaticity variations along an angular distribution (e.g., along the positive angular direction 83 and negative angular direction 85) relative to an optical axis 84. That is, color variations may be apparent depending on the angle (e.g., a "viewing angle") at which a light ray is emitted from the LED 58 relative to the optical axis 84.

For instance, as shown in FIG. 5, the light ray 86 emitted closest to or directly along the optical axis 84 travels a relatively short distance $d_1$ through the yellow phosphor layer 80.

Similarly, a light ray 88, which is emitted at a first angle (e.g., approximately 45 degrees relative to the optical axis 84), travels a farther distance $d_2$ through the yellow phosphor layer 80, and a light ray 90, which is emitted at a greater second angle (e.g., approximately 85 degrees relative to the optical axis 84), travels an even further distance $d_3$ through the yellow phosphor layer 80.

Thus, while the overall light emitted from the LED 58 is generally white in color, the emitted light may be more blue in color near the optical axis 84 due to the relatively short distance ($d_1$) at which it travels through the yellow phosphor layer 80, while light emitted further from the optical axis 84 becomes increasingly yellow in color due to the increasingly greater distances ($d_2$, $d_3$) at which it travels through the yellow phosphor layer 80. Accordingly, while the terms "blue" and "yellow" are used to describe the light emitted from the LED 58, it should be understood that these terms are not intended to imply that the emitted light is actually blue or yellow. Rather, the terms "blue" and "yellow" are meant to imply that the generally white light, when emitted closer to the optical axis 84 has a bluer tint relative to light emitted further away from the optical axis 84, which may have a more yellowish tint.

Figure 6:
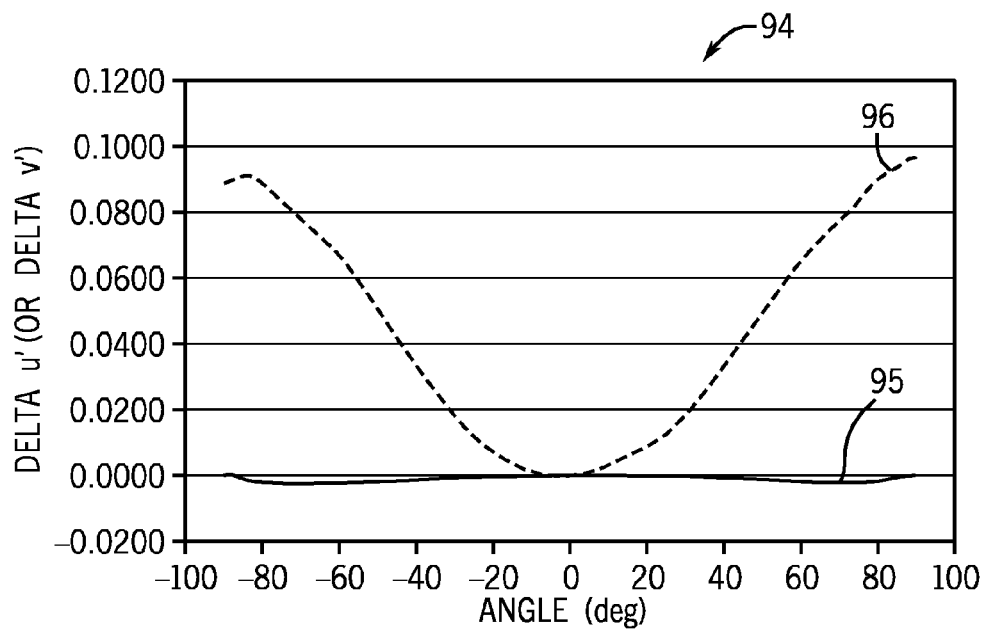
FIG. 6 is a graph depicting chromaticity variation with respect to angles at which light is emitted from the LED of FIG. 5.
Figure 7:
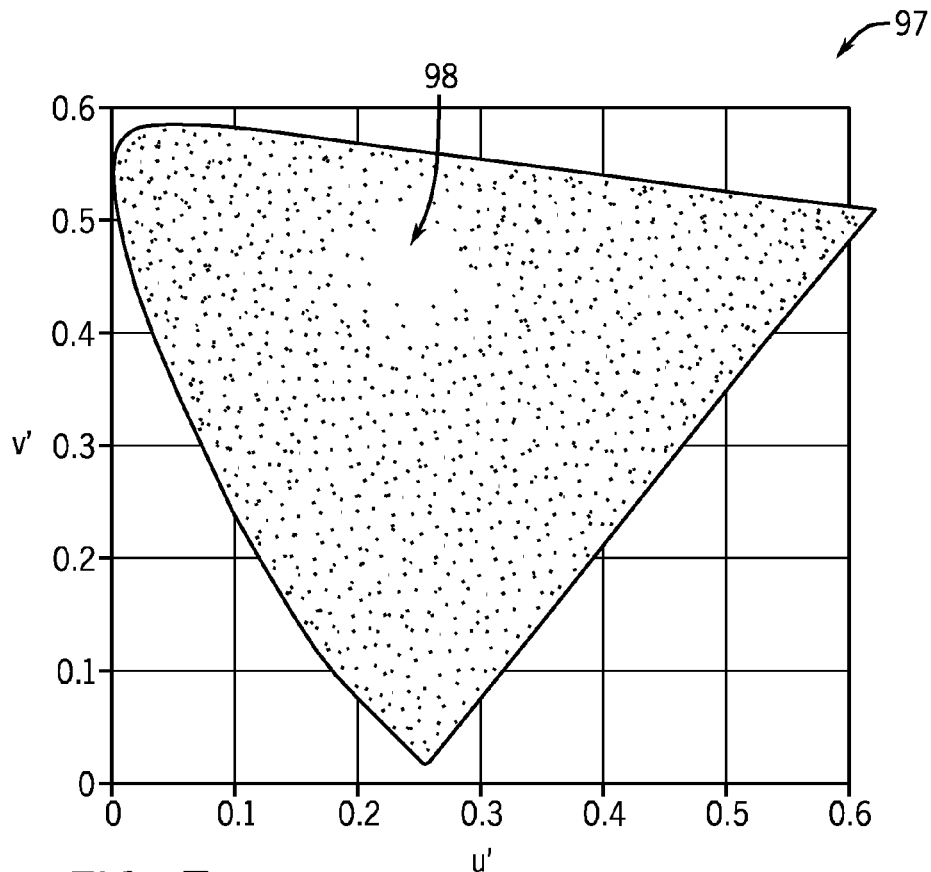
FIG. 7 is a diagram showing the CIE 1976 color space.

The above-described chromaticity variations in the blue-die and yellow phosphor-coated LED 58 of FIG. 5 may be better understood with respect to FIG. 6, which depicts a graph 94 showing the LED chromaticity variation over a range of viewing angles, and FIG. 7, which provides a diagram 97 of the CIE 1976 color space. As shown in the diagram 97, a white point 98 in the CIE 1976 diagram is approximately located at the coordinates 0.23 on the u' axis and 0.48 on the v' axis. As discussed above, the light emitted from the LED 58 exhibits increasing yellow characteristics as the viewing angle increases away from the optical axis 84, which this corresponds to a shift in the positive direction along the v' axis of the CIE 1976 color space diagram 97. Accordingly, the graph 94 shows that the Δv' (trace line 96) of the emitted light from the LED 58 increases as the viewing angle increases in both positive 83 and negative 85 angular directions with respect to the optical axis (e.g., 0 degrees), while the Δu' (trace line 95) remains generally constant. Again, it should be understood that the graph 94 is intended to illustrate the behavior of a blue-die and yellow phosphor-coated LED, and that the chromaticity variations shown in graph 94 may be different for other types of LEDs.

Figure 8:
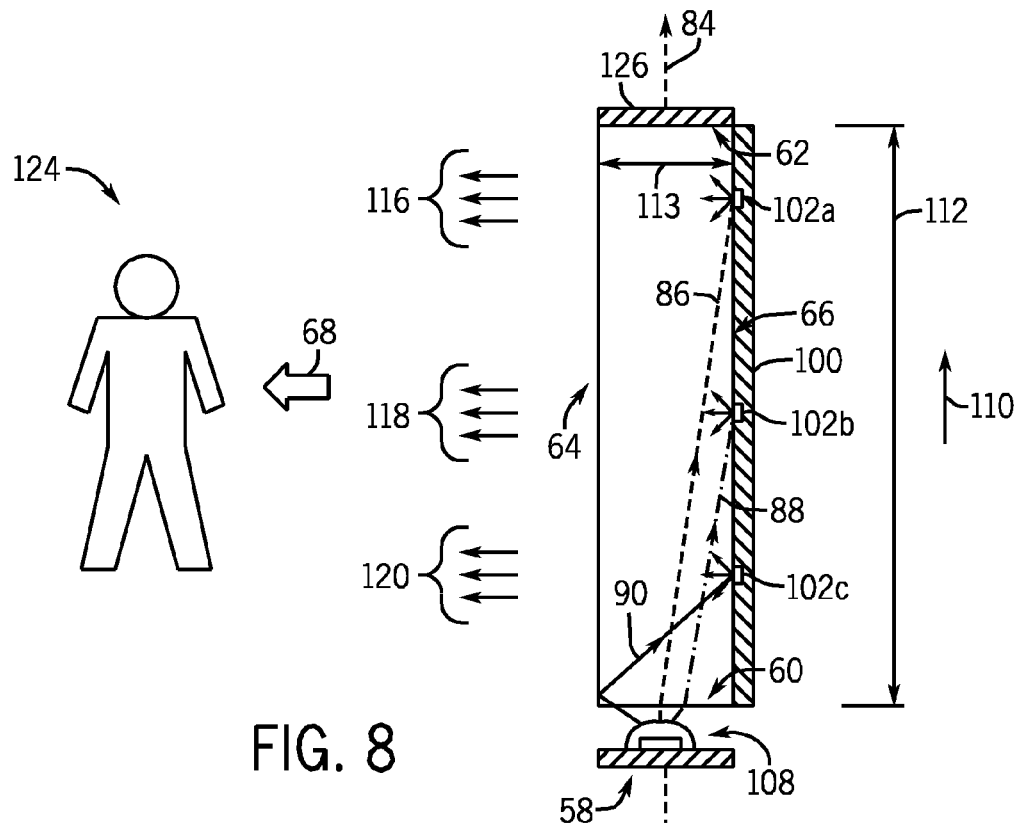
FIG. 8 is a simplified cross-sectional view of an edge-lit backlight unit and depicts how the propagation of light emitted from the LED of FIG. 5 may result in color shift along an axis of the edge-lit backlight unit.
Figure 9:
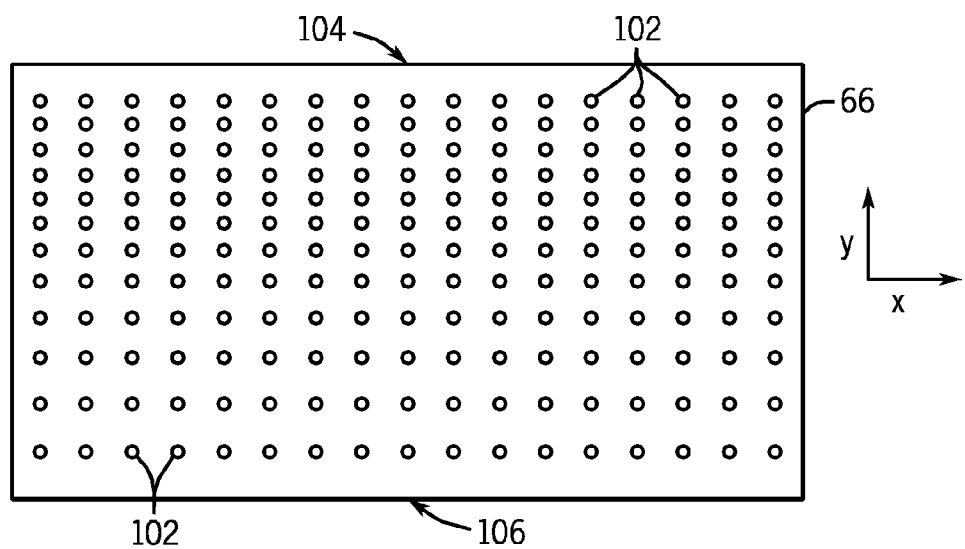
FIG. 9 depicts a rear surface of the edge-lit backlight unit shown in FIG. 8.

With the above points in mind, FIGS. 8 and 9 illustrate how the chromaticity variations of the LED 58 may result in a color shift along an axis with regard to light emitted from the forward surface 64 of a light guide 52 in an edge-lit backlight unit 48. Particularly, FIG. 8 depicts a simplified cross-sectional showing the propagation of the light rays 86, 88, and 90 emitted from the LED 58 (of the light source 56) through a light guide 52. In the present figure, the light guide 52 has a height depicted by reference numeral 112 and a thickness depicted by reference numeral 113. FIG. 9 depicts the rear surface 66 having an arrangement of light-extracting elements 102 configured to disrupt total internal reflection of light rays within the light guide 52. In conjunction with a back reflector 100 (e.g., a diffuse reflector), the disruption of total internal reflection by the light-extracting elements 102 may cause light to be emitted from the forward surface 64 of the light guide 52 of FIG. 8. It should also be understood that in some embodiments, the light-extracting elements 102 may be formed on the forward surface 64 instead of or in addition to being formed on the rear surface 66.

As shown in FIG. 8, the light rays 86, 88, and 90 are initially emitted from the LED 58 into an air gap 108 between the LED 58 and the lower edge 60 of the light guide 52. Though not specifically depicted in FIG. 8, it should be understood that due to the different refractive indexes of the air gap 108 and the material forming the light guide 52 (e.g., PMMA), the light rays 86, 88, and 90 may turn slightly toward the normal of the lower edge 60 as the light rays 86, 88, and 90 cross the air gap-light guide interface. As will be appreciated, the amount by which the light rays 86, 88, and 90 turn depends on the angle of incidence at which each respective light ray impacts the lower edge 60.

In the illustrated embodiment, the rear surface 66 having an upper edge 104 and lower edge 106 may include an arrangement of light-extracting elements 102, as shown more clearly in FIG. 9. Thus, as the light rays 86, 88, and 90 propagate from the lower edge 60 towards the upper edge 62 of the light guide 52 via total internal reflection, the light-extracting elements 102 may serve to disrupt total internal reflection to allow for some portion of the light rays 86, 88, and 90 to escape from the light guide 52 and be emitted from the forward surface 64. For instance, light impacting the light-extracting elements 102 may be refracted out of the light guide 52 to the back reflector 100. The back reflector 100 then reflects the light back into the light guide 52 and towards the forward surface 64 of the light guide 52, as shown in FIG. 8.

As will be appreciated, in some edge-lit backlight units, the light-extracting elements 102 on the rear surface 66 may be arranged to disrupt total internal reflection such that a substantial majority (e.g., greater than 95%) of the light entering the lower edge 60 escapes from the light guide 52 (e.g., through forward surface 64) before reaching the upper edge 62, and such that a substantial minority (e.g., less than 5%) of the light entering the lower edge 60 reaches the upper edge 62. For the portion of light that does reach the upper edge 62, a light guide 52 may include a diffuse reflector 126 on the upper edge 62, such that very little of the light that reaches the upper edge 62 is reflected back a substantial distance towards the lower edge 60 (e.g., a diffuse reflector generally causes reflected light to diffuse and spread evenly). In some light guides, diffuse reflectors may also be provided along the side edges 70 and 72 (FIG. 4) of the light guide 52.

By way of example, a rear surface 66, as shown in FIG. 9, may be configured such that the concentration of the light-extracting elements 102 prevents more than a substantial minority (e.g., less than 5%) from reaching the upper edge 62. Further, in the depicted rear surface 66, it should be noted that the spacing between the light-extracting elements 102 decreases along the y-axis from the bottom edge 106 to the top edge 104, such that the total surface area provided by the light-extracting elements is generally more concentrated near the top edge 104. This may function to provide a substantially uniform brightness by extracting a greater percentage of the remaining light near the top portion of the light guide 52.

Referring back to FIG. 8, the light ray 86, which generally constitutes "bluer" light relative to the light rays 88 and 90, propagates towards the upper edge 62 in the direction 110 and impacts the light-extracting element 102a, located at a generally higher position of the light guide 52 (relative to the height 112). It should be understood that the propagation of the light rays 86, 88, and 90 shown in FIG. 8 is intended to be a simplified depiction of the operation of the light guide 52. In practice, the light ray 86 may actually undergo total internal reflection against the forward 64 and rear surfaces 66 of the light guide 52 several times prior to impacting the light-extracting element 102a. Similarly, the light ray 88, which may be more yellow relative to the light ray 86, impacts the light-extracting element 102b, located at a generally middle position along the height 112, and the light ray 90, which may be even more yellow relative to both the light rays 86 and 88, impacts the light-extracting element 102c, located at a generally lower position along the height 112 of the light guide 52.

As will be appreciated, each of the light-extracting elements 102 may (in conjunction with the back reflector 100) be configured to extract the light that strikes it and cause the light to escape, and thus be emitted from the surface 64 in the forward direction 68. Further, due to the chromaticity variations in the light rays (86, 88, 90) emitted from the LED 58, as discussed above, the blue light (e.g., 86) has a greater probability of impacting light-extracting elements (e.g., 102a) located at a higher position on the rear surface 66, while the yellow light (e.g., 90) has a greater probability of impacting light-extracting elements (e.g., 102c) located at a lower position on the rear surface 66. Further, the light (e.g., 88) intermediate the blue and yellow light (e.g., blue-yellow light) has a higher probability of impacting light-extracting elements (e.g., 102b) located intermediate the higher (e.g., 102a) and lower (e.g., 102c) light-extracting elements, as shown in FIG. 8. Based on these characteristics, the light 116 emitted from the top of the light guide 52 may include a higher concentration of the blue light (e.g., 86), while the light 118 emitted from the middle of the light guide 52 may include a higher concentration of the blue-yellow light (e.g., 88), and the light 120 emitted from the bottom of the light guide 52 may include a higher concentration of the yellow light (e.g. 90). Thus, from the perspective of a viewer 124 viewing the emitted light 116, 118, and 120, a color shift along the vertical axis (e.g., along optical axis 84) may be present in the form of a yellow-to-blue trend from the bottom to the top of the LCD display 34, thus negatively impacting color uniformity across the display.

Before continuing, it should it be understood that a yellow-to-blue trend from the bottom to the top of the light guide 52 is based upon the illustrated configuration, in which the LED light source 56 is positioned along the lower lateral edge 60. As will be appreciated, if the LED light source 56 were to be positioned along the upper lateral edge 62, the yellow-to-blue trend would appear from the top to the bottom of the light guide 52 and, similarly, if the LED light source 56 were to be positioned along a side edge, such as edge 70, then yellow-to-blue trend would appear across a horizontal axis of the light guide 52, i.e., from edge 70 to edge 72.

Figure 10:
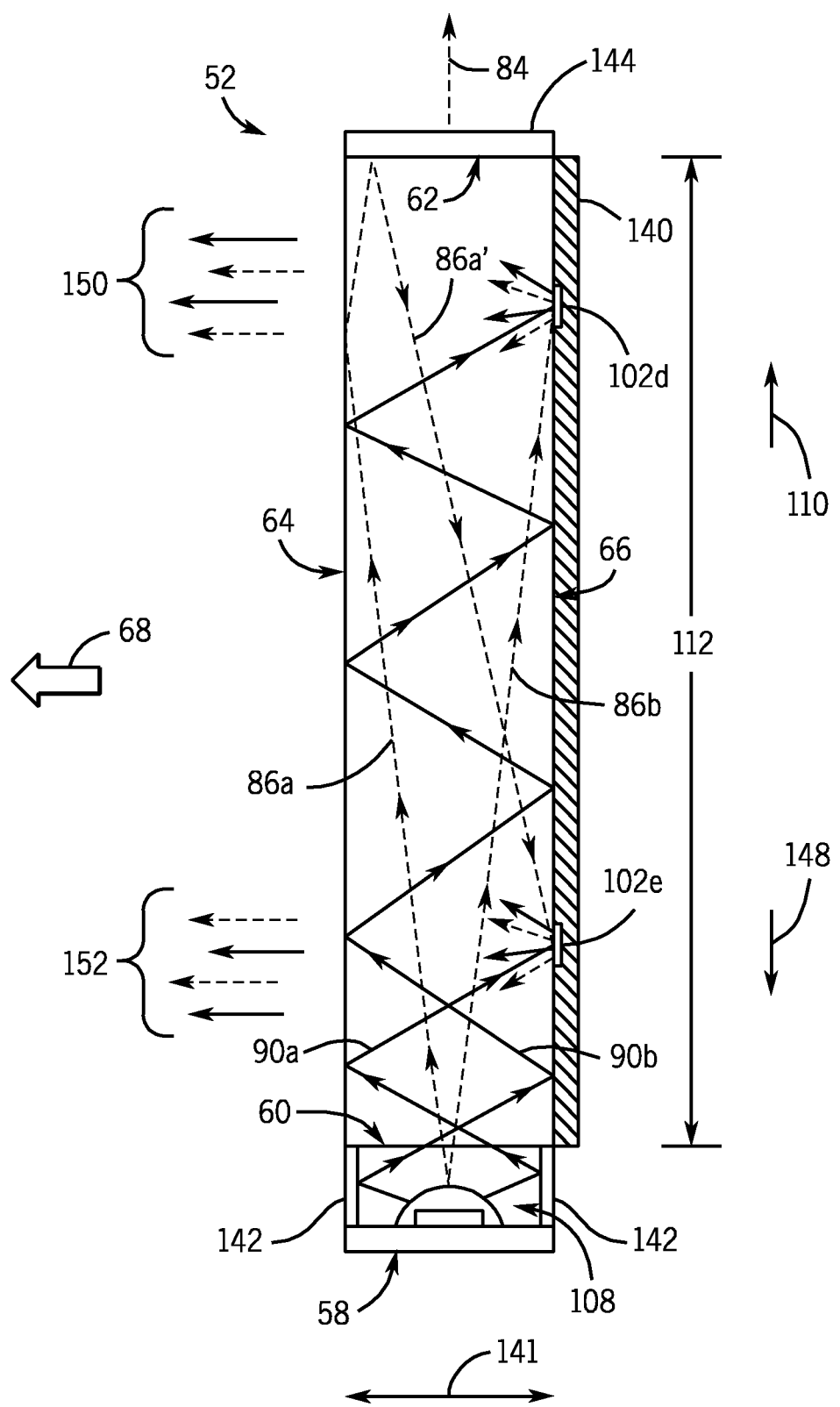
FIG. 10 is a simplified cross-sectional view of an edge-lit backlight unit configured to provide for retro-propagation of light emitted from the LED of FIG. 5 to reduce color shift along an axis of the edge-lit backlight unit, in accordance with aspects of the present disclosure.
Figure 11:
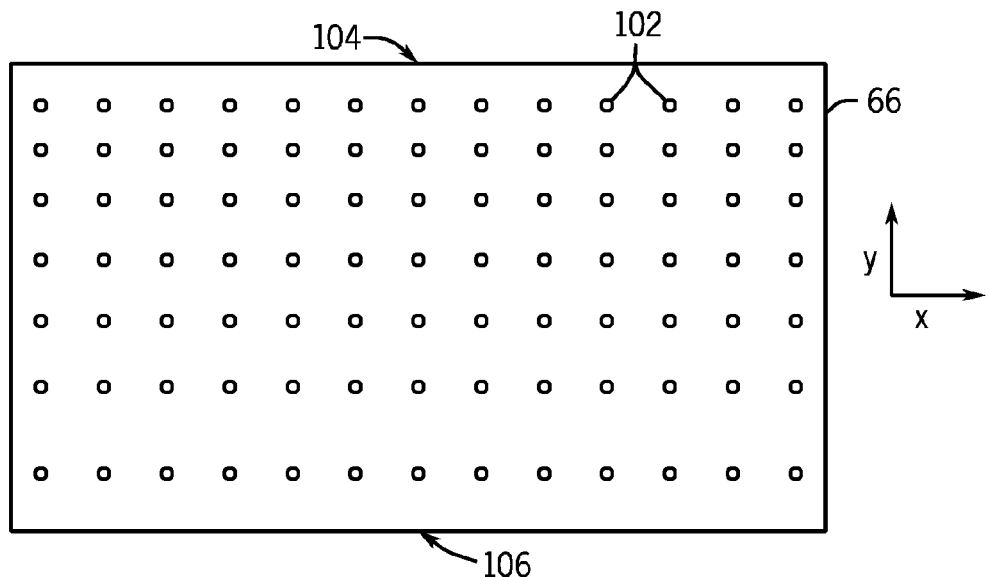
FIGS. 11 and 12 depict embodiments of rear surfaces of the edge-lit backlight unit shown in FIG. 10, in accordance with aspects of the present disclosure.
Figure 12:
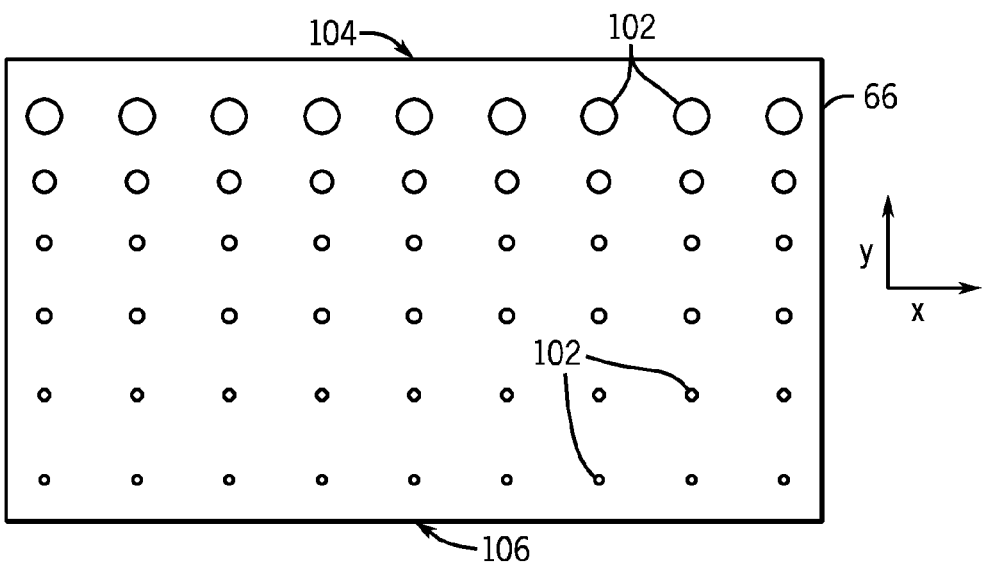

Having described the operation of one LED-based backlight unit and the drawbacks thereof regarding color non-uniformity, FIGS. 10-12 are provided to illustrate various aspects of the presently disclosed techniques that may be applied to a backlight unit 48 to reduce color shift caused by chromaticity variations in light emitted from LEDs 58 and, thus, improve overall color uniformity of light emitted from the backlight unit 48.

To provide an overview, an edge-lit backlight unit 48, in accordance with certain embodiments of the present technique, may include a light guide 52 having a specular reflector disposed at a lateral edge (e.g., edge 62) opposite the lateral edge (e.g., edge 60) that receives light from the light source 56. The reflector may be provided in conjunction with an arrangement of light-extracting elements (e.g., 102 on rear surface 66) that allows for a portion of the light propagating within the light guide 52 to reach the opposite lateral edge (e.g., edge 62), that portion being greater relative to the substantial minority of light (e.g., less than 5%) that reaches the opposite lateral edge in the light guide of FIGS. 8 and 9. In certain embodiments, the reflector along the edge 62 may be a specular reflector, or may be a reflector having a combination of specular and diffuse reflective components. The light that reaches the specular reflector at the opposite lateral edge is directed back towards the first lateral edge via retro-propagation. As discussed below, this retro-propagation technique improves the uniformity in which the blue and yellow light is extracted by the light-extracting elements, thus providing a light output from the forward surface of the light guide 52 that appears more uniform relative to the output of the light guide discussed above in FIGS. 8 and 9.

Referring to FIG. 10, a simplified cross-sectional view of a light guide 52 for an edge-lit backlight unit 48 is illustrated, in accordance with one embodiment. The light guide 52 of FIG. 10 is shown in more detail (e.g., larger) to better illustrate the retro-propagation technique, but it should be understood that the presently depicted light guide may have a height 112 that is generally identical to the light guide of FIG. 8. In certain embodiments, it should be noted that the thickness 141 of the light guide 52 in FIG. 10, which may also be formed from PMMA or any other suitable material, or may be an air guide, may be less relative to certain conventional light guides. By way of example, the light guide 52 of FIG. 10 may have a thickness 141 of between approximately 1 to 10 millimeters or, in some embodiments, between approximately 1 to 6 millimeters.

As shown in FIG. 10, the LED 58 emits light into an air gap 108, which is then received by a lower edge 60 of the light guide 52. Though not specifically illustrated in FIG. 10, as discussed above, the light rays may turn slightly due to the different refractive indexes of the air gap 108 and the material forming the light guide 52. Further, due to the decreased thickness 141 of the light guide 52 (e.g., relative to certain conventional light guides), the depicted embodiment also provides mirrors 142 disposed adjacent to the LED 58 and parallel to the forward surface 64 and rear surface 66 which serve to direct light that would have otherwise not crossed the air gap-light guide interface (e.g., at lower edge 60).

Referring briefly to FIGS. 11 and 12, embodiments of a rear surface 66 that may be used in conjunction with the light guide 52 of FIG. 10 are illustrated. As mentioned above, the rear surface 66 may include a configuration of light-extracting elements 102 which allow for a greater portion of the light propagating through the light guide 52 (in the propagation direction 110) to reach the upper edge 62. For instance, in the embodiment shown in FIG. 11, the light-extracting elements 102 may be arranged such that they are less concentrated relative to the arrangement of the light-extracting elements 102 in the alternative rear surface 66 of FIG. 9. For instance, while the spacing between the light-extracting elements 102 in FIG. 11 generally decreases in the y-direction from the lower edge 106 to the upper edge 104, the overall spacing between the light-extracting elements 102 of FIG. 11 is generally greater than the spacing of the light-extracting elements 102 shown in FIG. 9 in both the x- and y-directions. Thus, the overall surface area of the rear surface 66 that is covered by light-extracting elements 102 is less relative to the surface area of that depicted in FIG. 9.

As can be appreciated, due to this lowered concentration, and thus surface area, of light-extracting elements 102, the rear surface 66 of FIG. 11 provides for less disruption of total internal reflection, thereby allowing a greater portion of the propagating light to reach the upper edge 62 of the light guide 52. FIG. 12 depicts an alternate embodiment of the rear surface 66 in which the spacing of the light-extracting elements 102 is also greater in the x- and y-directions relative to the spacing of the light-extracting elements 102 in the rear surface 66 of FIG. 9. Additionally, the rear surface 66 of FIG. 12 is also configured such that the size of the light-extracting elements 102 generally increases and such that the spacing between the light-extracting elements 102 generally decreases in the y-direction from the lower edge 106 to the upper edge 104.

It should be understood that by concentrating the surface area provided by the light-extracting elements 102 closer to the top edge 104 of the rear surface 66, brightness uniformity may be better maintained. Further, while the light-extracting elements 102 in FIGS. 11 and 12 are shown as being generally circular in shape (e.g., circular micro-lenses and/or printed dots), any suitable type of light-extracting elements for disrupting total internal reflection may be provided, such as micro-prisms, grooves, elliptical-shaped elements, square or rectangular-shaped elements, and so forth. As will be appreciated, these light-extracting elements 102 may be configured to refract and/or reflect light towards a back reflector, shown here by reference numeral 140. Light reflected by the back reflector 140 may be directed towards the surface 64, and may be emitted therefrom.

Referring back to FIG. 10, the light-extracting elements 102 may be configured to reduce the disruption of total internal reflection in the propagation direction 110, and allows for a greater portion of the light propagating from the lower edge 60 to reach the upper edge 62. For example, as shown in FIG. 10, a blue light ray 86a emitted from the LED 58 may propagate towards the upper edge 62 and impact a specular reflector 144 disposed at the upper edge 62. By way of example, the specular reflector 144 may be provided as a silver reflector or an enhanced spectral reflector (ESR) film, such as a model of Vikuiti® ESR film, available from 3M Company. As discussed above, in some embodiments, the reflector 144 could also include a combination of specular and diffuse components to provide for retro-propagation.

Upon impacting the specular reflector 144, the blue light ray 86a may be directed back towards the lower edge 60 via retro-propagation (e.g., in direction 148) and total internal reflection, as indicated by reference number 86a', ultimately impacting the light-extracting element 102e, which is located at a generally lower position along the height 112 of the light guide 52. As can be appreciated, because the light rays emitted closer to the optical axis 84 undergo total internal reflection less frequently than light rays emitted further from the optical axis 84, the light rays that ultimately reach the upper edge 52 may include a greater proportion of blue light rays. Accordingly, the majority of the retro-propagated light may include blue-tinted light, such as light ray 86a'.

Meanwhile, a yellow light ray 90a emitted from the LED 58 impacts the mirror 142 and is directed into the light guide 52, propagating via total internal reflection until also impacting the light-extracting element 102e. Thus, the light-extracting element 102e extracts light from the propagating yellow ray 90a and the retro-propagating blue ray 86a', thereby causing a mixture of blue and yellow light to be emitted from the lower position of the light guide 52, as indicated by reference number 152. Again, it should be understood that the use of the term "blue" and "yellow" are meant to imply that the generally white light emitted from the LED 58 may have either a bluish or yellowish tint (e.g., depending on the viewing angle at which the light is emitted from the LED 58), and not that the light is actually a "true" blue or yellow colored light.

The present technique also provides for the mixture and extraction of yellow light with blue light at generally higher positions of the light guide 52 to provide enhanced color uniformity in the light output. For example, as shown in FIG. 10, the blue light ray 86b and yellow light ray 90b are also emitted from the LED 58. The blue light ray 86b undergoes total internal reflection (not shown in this simplified illustration) until it impacts the light-extracting element 102d, located generally at a higher position along the height 112 of the light guide 52. Meanwhile, since the total light-extracting surface area of the rear surface 66 is reduced relative to that of FIGS. 8 and 9, the probability of disrupting total internal reflection of a yellow light ray 90b in the lower region of the light guide 52 is reduced, thus allowing the yellow light ray 90b to travel further in the propagation direction 110. In the depicted embodiment, the yellow light ray 90b also impacts the light-extracting element 102d. As such, the light-extracting element 102d extracts light from the propagating yellow ray 90b and the propagating blue ray 86b, thereby also causing a mixture of blue and yellow light to be emitted from a higher position of the light guide 52, as indicated by reference number 150.

Though not shown in FIG. 10, it should be understood that intermediate "blue-yellow" light rays (e.g., 88) are also present and may undergo total internal reflection within the light guide 52 and mix with yellow and/or blue light in a similar manner. Further, in some instances, some of the yellow light rays (e.g., 90a, 90b) may also reach the upper edge 62 and retro-propagate towards the lower edge 60, impacting with light-extracting elements 102 as it is retro-propagated in the direction 148 and mixing with propagating and/or retro-propagating blue (e.g., 86).

While FIG. 10 only depicts the mixture of emitted blue and yellow light at a high-positioned location (e.g., 102d) and a low-positioned location (e.g., 102e) along the height 112 of the light guide 52 in order to illustrate certain aspects of the present technique, it should be appreciated that the present technique of using a specular reflector 144 and light-extracting elements 102 configured to provide for significant retro-propagation may result in improved color uniformity in the vertical direction (e.g., along axis 84) across the entire height 112 of the light guide 52. Thus, compared to the light output of the light guide shown in FIG. 8, a light guide 52 using the presently disclosed retro-propagation technique reduces color shift caused by chromaticity variations of the LED 58, thereby providing for an overall improved color uniformity in the light output from the LCD display 34.

The mixture of the blue and yellow light, as described herein, may be accomplished via additive mixing. For instance, referring to the extraction and mixture of light impacting the light-extracting element 102e of FIG. 10, the light extracted from the propagating yellow light 90a may be expressed by the variables $x_1$, $y_1$, and $Y_1$, and the light extracted from the retro-propagating blue light 86a' may be expressed by the variables $x_2$, $y_2$, and $Y_2$, wherein the variables $x_1$, $x_2$, $y_1$, and $y_2$ represent CIE 1931 color space chromaticity coordinates of their respective light beams, and wherein the variables $Y_1$ and $Y_2$ represent the luminance of their respective light beams. Thus, the (x, y) CIE 1931 chromaticity coordinates of the resulting mixed light may be expressed as:

$$x = \frac{m_1 x_1 + m_2 x_2}{m_1 + m_2} \quad \text{(Equation 1)}$$

$$y = \frac{m_1 y_1 + m_2 y_2}{m_1 + m_2}, \quad \text{(Equation 2)}$$

wherein the variables $m_1$ and $m_2$ may be computed as follows:

$$m_1 = \frac{Y_1}{y_1} \quad \text{(Equation 3)}$$

$$m_2 = \frac{Y_2}{y_2} \quad \text{(Equation 4)}$$

Additionally, the total luminance of the mixed light may be expressed as follows $$Y_{total} = Y_1 + Y_2 \quad \text{(Equation 5)}$$

The CIE 1931 chromaticity coordinates (x, y) of the mixed light output may be converted to coordinates within the CIE 1976 color space shown in FIG. 7 (which is generally more uniform relative to the CIE 1931 color space), by applying the following transfer functions to the CIE 1931 x and y coordinates to obtain corresponding CIE 1976 u' and v' coordinates:

$$u' = \frac{4x}{(-2x + 12y + 3)} \quad \text{(Equation 6)}$$

$$v' = \frac{9y}{(-2x + 12y + 3)} \quad \text{(Equation 7)}$$

Obtaining an acceptable color uniformity in the mixed propagating and retro-propagating light may be accomplished, in certain embodiments, by achieving a Δu'v' of less than about 0.005 (referring to the graph 94 of FIG. 6 and the diagram 97 of FIG. 7). As can be appreciated, light output having a Δu'v' of less than about 0.005 may appear as being substantially uniform in color. In such embodiments, this may be accomplished by configuring the light guide 52, such that the portion of the propagating light that reaches the upper edge 62 and retro-propagates back towards the lower edge 60 is between approximately 5% to 35% of the total luminosity, i.e., total light from the light source 56 that enters the light guide 52. For example, the percentage of the retro-propagated light may be approximately 5%, 10%, 15%, 20%, 25%, 30%, or 35% of the total luminosity.

One technique for measuring the luminosity extracted from the propagating light (e.g., in direction 110) is hereinafter described. The technique may include replacing the specular reflector 144 with a diffuse reflector or black absorption material. The backlight unit luminosity measured with the absorption material will be equivalent to the light extracted from the propagating light (e.g., in direction 110), denoted by the variable $L_{prop}$. The specular reflector 144 may then be replaced, and the total luminosity of the backlight unit may be measured to obtain a total luminosity, $L_{total}$. Accordingly, the retro-propagating light, $L_{retro}$, may be calculated as follows:

$$L_{retro} = L_{total} - L_{prop} \quad \text{(Equation 8)}$$

The percentage of retro-propagated light ($L_{retro}$) relative to total luminosity ($L_{total}$) may then be determined as follows:

$$c = \frac{L_{retro}}{L_{total}} \quad \text{(Equation 9)}$$

As discussed above, an acceptable color uniformity level may be achieved when c is between approximately 5% to 35%. As will be appreciated, c may be adjusted by either varying reflective properties of the specular reflector 144 (e.g., using specular reflectors having different reflection properties, or by adjusting a combination of specular and diffuse reflector components at the lateral edge 62) or by configuring the arrangement of the light-extracting elements 102 on the rear surface 66, or both.

Figure 13:
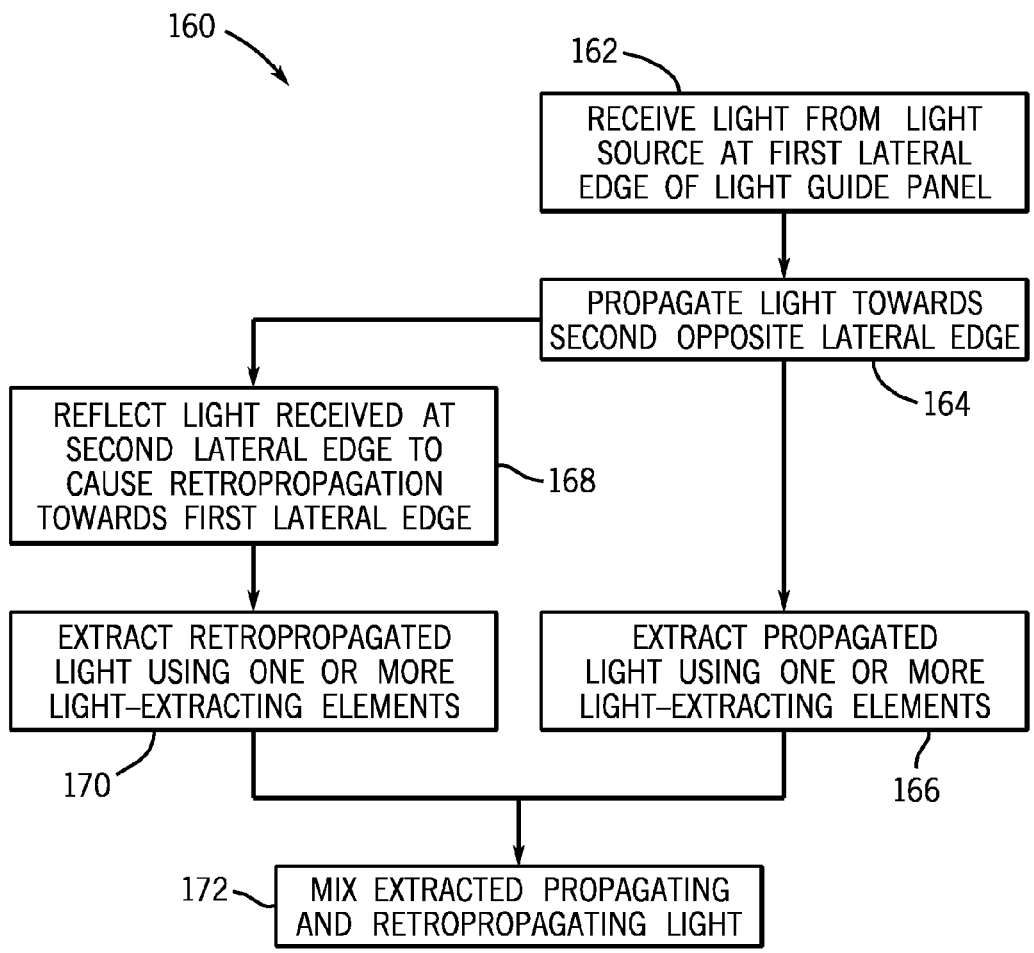
FIG. 13 is a flowchart depicting a method for reducing color shift in light emitted from a backlight unit of a display device, in accordance with aspects of the present disclosure.

With the foregoing points in mind, FIG. 13 depicts a method 160 for improving color uniformity of an edge-lit backlight unit of a display device, in accordance with aspects of the present disclosure described herein. Beginning at block 162, light is received at a first lateral edge (e.g., edge 60) of a light guide panel 52 of the backlight unit 48. As discussed, the light may be provided by one or more LEDs arranged along the first lateral edge. Further, although the embodiments above depict the LEDs (e.g., 58) as being arranged along a lower lateral edge 60 of the light guide 52, it should be understood that the LEDs may be arranged along any one of the lateral edges of the light guide, such as the edges 62, 70, or 72.

Next, at block 164, light enters the light guide 52 at the first edge (e.g., edge 60) and propagates via total internal reflection towards a second edge (e.g., edge 62) opposite the first edge. From block 164, the method 160 then branches to both of blocks 166 and 168. As shown at block 166, light-extracting elements (e.g., 102) may extract some of the propagating light by disrupting total internal reflection. At block 168, propagating light that reaches the second lateral edge (e.g., upper edge 62) is reflected, such as by using a specular reflector 144, and is thus retro-propagated back towards the first edge via total internal reflection. As indicated at block 170, one or more light-extracting elements 102 may extract the retro-propagated light. For instance, retro-propagating light may impact the light-extracting elements that extracted the propagating light (block 166). As discussed above the retro-propagating light may include light emitted close to an optical axis (e.g., 84) of an LED (e.g., blue light) or farther from the optical axis of the LED (e.g., yellow light), and retro-propagating light may potentially be extracted by any of the light-extracting elements 102 of the rear surface 66. The extracted propagating and retro-propagating light is mixed, as shown at block 172, and may be subsequently emitted from the light guide 52, to provide a more uniform light output.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display backlight unit comprising:
 a light guide configured to receive light from a light source, wherein the light comprises a first portion comprising more of a first color and less of a second color and a second portion comprising less of the first color and more of the second color, wherein the light guide is configured to cause the light to propagate from a first lateral edge towards a second opposite lateral edge of the light guide, and wherein the light guide is configured to cause the first portion to reach the second lateral edge and to retro-propagate from the second lateral edge back towards the first lateral edge; and
 a plurality of light-extracting elements configured to extract the second portion substantially prior to the second lateral edge and to extract the retro-propagating first portion of the light;
 wherein the plurality of light-extracting elements is configured to extract the first and second portions of the light to mix the first and second portions to provide substantially uniform color along an axis of the light guide.

2. The display backlight unit of claim 1, comprising the light source, wherein the light source is arranged along the first lateral edge.

3. The display backlight unit of claim 1, wherein the second lateral edge comprises a specular reflector configured to cause retro-propagation of the first portion of the propagating light received at the second lateral edge.

4. The display backlight unit of claim 1, wherein the second lateral edge comprises a reflector having a combination of diffuse and specular components configured to cause retro-propagation of the first portion of the propagating light received at the second lateral edge.

5. The display backlight unit of claim 1, wherein the light guide is configured to allow between approximately 5 to 35 percent of the light received by the light guide from the light source to reach the second lateral edge and to retro-propagate from the second lateral edge back towards the first lateral edge.

6. The display backlight unit of claim 1, wherein the plurality of light-extracting elements includes light-extracting elements formed on a rear surface of the light guide.

7. The display backlight unit of claim 1, wherein the plurality of light-extracting elements comprises printed dots, micro-lenses, micro-prisms, circular light-extracting elements, non-circular light-extracting elements, elliptical light-extracting elements, square light-extracting elements, rectangular light-extracting elements, groove-shaped light-extracting elements, or some combination thereof.

8. The display backlight unit of claim 1, comprising the light source, wherein the light source comprises a plurality of light emitting diodes (LEDs), at least one of the plurality of LEDs exhibits chromaticity variations across a distribution of viewing angles from optical axes of the respective LEDs, and the plurality of LEDs comprise phosphor-coated LEDs.

9. The display backlight unit of claim 8, wherein the plurality of LEDs comprise a blue-light emitting die with a yellow phosphor coating.

10. The display backlight unit of claim 9, the chromaticity variations comprise bluer light emitted substantially along the optical axes, and more yellow light emitted away from the optical axes.

11. The display backlight unit of claim 1, wherein the first color comprises blue.

12. A method, comprising:
 receiving light from a light source at a first lateral edge of a light guide of a backlight unit, wherein the received light exhibits a non-uniform color characteristic across a distribution of viewing angles from an optical axis of the light source;
 propagating the received light through a propagation medium and towards a second lateral edge of the light guide, wherein the second lateral edge is opposite the first lateral edge, and wherein a first portion of the propagating light reaches the second lateral edge;
 using a reflective element disposed at the second lateral edge to cause substantially the entire first portion of the propagating light reaching the second lateral edge to retro-propagate towards the first lateral edge;
 using a plurality of light extracting features formed on a rear surface of the light guide to extract a second portion of the propagating light and to extract the retro-propagating first portion of the light; and
 mixing the extracted second portion of the propagating light and the extracted retro-propagating first portion of the light to improve color uniformity in light emitted from a front surface of the light guide, wherein the retro-propagating first portion of the light comprises more of the light emitted along the optical axis and less of the light emitted away from the optical axis, and the second portion of the light comprises less of the light emitted along the optical axis and more of the light emitted away from the optical axis.

13. The method of claim 12, wherein the propagation medium comprises polymethyl-methacrylate or air, or some combination thereof.

14. The method of claim 12, wherein the light source comprises at least one light-emitting diode (LED), and wherein the non-uniform color characteristic is attributable to chromaticity variations of the at least one LED across the distribution of viewing angles.

15. The method of claim 12, wherein the light emitted from the backlight unit has a Δu'v' of less than approximately 0.005 based upon the CIE 1976 color space.

16. A display device comprising:
a liquid crystal display panel; and
an edge-lit backlight unit comprising:
a light source;
a light guide comprising a first lateral edge, a second lateral edge opposite the first lateral edge, a front surface, and a rear surface, at least one of the front surface and the rear surface having a plurality of light-extracting elements, wherein the light guide is configured to receive light emitted from the light source along the first lateral edge and to propagate the received light towards the second lateral edge, and wherein the plurality of light-extracting elements is configured to allow a first portion of the propagating light to reach the second lateral edge and to extract a second portion of the propagating light, wherein the first portion comprises more of a first color and less of a second color, and the second portion comprising less of the first color and more of the second color; and
a specular reflector disposed at the second lateral edge and configured to cause substantially the entire first portion of the propagating light to retro-propagate back towards the first lateral edge;
wherein the light guide is configured such that the retro-propagating first portion of the light is extracted by the plurality of light-extracting elements, wherein the extracted retro-propagating first portion of the light and the extracted second portion of the propagating light is mixed and emitted from the light guide, and wherein the mixed light emitted from the light guide is substantially uniform in color.

17. The display device of claim 16, wherein the light source comprises one or more light-emitting diodes (LEDs).

18. The display device of claim 17, wherein at least one of the one or more LEDs comprises a phosphor-coated LED that exhibits chromaticity variations across a distribution of viewing angles, and wherein the mixing of the extracted second portion of the propagating light and the extracted retro-propagating first portion of the light reduces color shift caused by the chromaticity variations of the phosphor-coated LED.

19. The display device of claim 18, wherein the phosphor-coated LED is configured to emit generally white light and comprises one of an LED having a blue-light emitting die with a yellow phosphor coating or an LED having a blue-light emitting die with a red and green phosphor coating.

20. The display device of claim 18, wherein the phosphor-coated LED is configured to emit a bluer light along an optical axis and a less blue light away from the optical axis.

21. The display device of claim 17, wherein the light source is configured such that the one or more LEDs are facing the first lateral edge.

22. The display device of claim 21, comprising a first reflector disposed on a first side of the one or more LEDs and a second reflector disposed on a second side of the one or more LEDs, wherein light that is not projected directly into the light guide at the first lateral edge by the one or more LEDs is directed into the light guide by the first or second reflectors.

23. A method of reducing color shift in an edge-lit backlight unit, the method comprising:
receiving light emitted from a light source at a first lateral edge of a light guide;
propagating the light towards a second lateral edge opposite the first lateral edge;
extracting a second portion of the light during propagation towards the second lateral edge using one or more light-extracting elements;
receiving, at the second lateral edge, a first portion of the light not extracted by the one or more light-extracting elements during propagation;
retro-propagating the first portion of the light received at the second lateral edge towards the first lateral edge;
extracting the retro-propagating first portion of the light using the one or more light-extracting elements; and
emitting the extracted second portion of the propagating light and the extracted retro-propagating first portion of the light from a front surface of the light guide, wherein the first portion comprises more of a first color and less of a second color, and the second portion comprising less of the first color and more of the second color.

24. The method of claim 23, wherein propagation and retro-propagation occur via total internal reflection within the light guide.

25. The method of claim 23, wherein retro-propagating the first portion of the light received at the second lateral edge comprises using a specular reflector disposed at the second lateral edge.

26. The method of claim 23, wherein the first portion of the light that is retro-propagated back towards the first lateral edge comprises between approximately 5 to 35 percent of the light received by the light guide from the light source.

27. An electronic device, comprising:
one or more input structures;
a storage structure encoding one or more executable routines;
a processor capable of receiving inputs from the one or more input structures and of executing the one or more executable routines when loaded in a memory; and
a display device configured to display an output of the processor, wherein the display device comprises:
a liquid crystal display panel; and
a backlight unit comprising:
a light source configured to provide direct lighting to the backlight unit by emitting light that exhibits a non-uniform color characteristic; and
a light guide configured to receive the light from the light source, wherein the light comprises a first portion comprising more of a first color and less of a second color, and a second portion comprising less of the first color and more of the second color, wherein the light guide is configured to cause the light to propagate from a first lateral edge towards a second opposite lateral edge of the light guide, to cause the first portion to reach the second lateral edge and to retro-propagate from the second lateral edge back towards the first lateral edge, to extract the second portion of the propagating light substantially prior to the second lateral edge, and to extract the retro-propagating first portion of the light;

wherein the extracted second portion of the propagating light and the extracted retro-propagating first portion of the light are mixed to improve color uniformity in light emitted from the light guide towards the liquid crystal display panel.

28. The electronic device of claim 27, wherein the second lateral edge comprises a specular reflector configured to cause retro-propagation of the first portion of the propagating light received at the second lateral edge.

29. The electronic device of claim 27, wherein the light guide has a thickness of between approximately 1 to 6 millimeters.

30. The electronic device of claim 27, wherein the electronic device comprises a desktop computer, a laptop computer, a tablet computer, a digital media player, or a mobile telephone.

31. A display backlight unit comprising:
a light guide configured to receive light from a light source, wherein the light comprises chromaticity variations across a distribution of viewing angles from an optical axis of the light source, wherein the light guide is configured to cause the light to propagate from a first lateral edge towards a second opposite lateral edge of the light guide, and to cause a first portion of the propagating-light to reach the second lateral edge and to retro-propagate from the second lateral edge back towards the first lateral edge, wherein the retro-propagating first portion comprises more of the light emitted along the optical axis and less of the light emitted away from the optical axis; and
a plurality of light-extracting elements configured to extract a second portion of the propagating light substantially prior to reaching the second lateral edge and to extract the retro-propagating first portion of the light, wherein the extracted second portion of the propagating light comprises less of the light emitted along the optical axis and more of the light emitted away from the optical axis, the plurality of light-extracting elements are arranged on a rear surface of the light guide and are configured to reduce the disruption of total internal reflection of the propagating light, wherein a size of the plurality of light extracting elements increases from the first lateral edge to the second lateral edge, and a spacing of the plurality of light extracting elements decreases from the first lateral edge to the second lateral edge;
wherein the extracted first and second portions of the light are mixed and emitted from the plurality of light-extracting features as light output to provide substantially uniform color along an axis of the light guide, wherein the light output has a $\Delta u'v'$ of less than approximately 0.005 based upon the CIE 1976 color space.

32. The display backlight unit of claim 31, comprising the light source, wherein the light source comprises a plurality of light emitting diodes arranged along the first lateral edge.

33. The display backlight unit of claim 31, wherein the plurality of light-extracting elements are arranged to increase the first portion of the propagating light received at the second lateral edge to between approximately 5 to 35 percent of the light received by the light guide.

34. A display backlight unit comprising:
a light source comprising one or more light-emitting diodes (LEDs), wherein at least one of the one or more LEDs exhibits chromaticity variations across a distribution of viewing angles from optical axes of the respective LEDs, wherein the chromaticity variations comprise bluer light emitted substantially along the optical axes, and more yellow light emitted away from the optical axes;
a light guide comprising a first lateral edge, a second opposite lateral edge, and a forward surface disposed between the first lateral edge and the second lateral edge, wherein the light guide is configured to receive light from the light source, to cause the light to propagate from the first lateral edge towards the second opposite lateral edge of the light guide, and to cause a first portion of the light to reach the second lateral edge and to retro-propagate from the second lateral edge back towards the first lateral edge, wherein the retro-propagating first portion comprises more of the bluer light and less of the more yellow light; and
a plurality of light-extracting elements configured to extract a second portion of the light substantially prior to reaching the second lateral edge, to extract the retro-propagating first portion of the light, wherein the second portion of the light comprises more of the more yellow light and less of the bluer light, and to mix the first and second portions of the light as mixed light, wherein the plurality of light-extracting elements is configured to emit the mixed light through the forward surface of the light guide to provide a substantially uniform color light output from the forward surface.

35. The display backlight unit of claim 34, wherein the light output has a $\Delta u'v'$ of less than approximately 0.005 based upon the CIE 1976 color space.

* * * * *